United States Patent
Song et al.

(10) Patent No.: US 10,926,747 B2
(45) Date of Patent: Feb. 23, 2021

(54) PULSATION DAMPING DEVICE OF HYDRAULIC BRAKE SYSTEM

(71) Applicant: MANDO CORPORATION, Gyeonggi-do (KR)

(72) Inventors: Min Geun Song, Daejeon (KR); Heeseung Baek, Gyeonggi-do (KR)

(73) Assignee: MANDO CORPORATION, Gyeonggi-do (KR)

(*) Notice: Subject to any disclaimer, the term of this patent is extended or adjusted under 35 U.S.C. 154(b) by 8 days.

(21) Appl. No.: 16/352,815

(22) Filed: Mar. 13, 2019

(65) Prior Publication Data
US 2019/0283724 A1  Sep. 19, 2019

(30) Foreign Application Priority Data

Mar. 14, 2018 (KR) .................. 10-2018-0029560
Mar. 14, 2018 (KR) .................. 10-2018-0029781

(51) Int. Cl.
| | |
|---|---|
| *B60T 8/40* | (2006.01) |
| *B60T 8/34* | (2006.01) |
| *B60T 8/42* | (2006.01) |
| *B60T 8/48* | (2006.01) |

(52) U.S. Cl.
CPC ............ *B60T 8/4068* (2013.01); *B60T 8/344* (2013.01); *B60T 8/42* (2013.01); *B60T 8/4872* (2013.01)

(58) Field of Classification Search
CPC ... B60T 8/40; B60T 8/42; B60T 8/344; B60T 8/368; B60T 8/4068; F16L 55/052; F16L 55/053

USPC .... 303/10, 87, DIG. 8, DIG. 11; 138/26, 30, 138/31
See application file for complete search history.

(56) References Cited

U.S. PATENT DOCUMENTS

| | | | | |
|---|---|---|---|---|
| 5,682,923 | A | * 11/1997 | Goloff | F16L 55/053 138/26 |
| 6,164,336 | A | * 12/2000 | Pasquet | F16L 55/052 138/30 |
| 9,096,200 | B2 | * 8/2015 | Zeoli | B60T 8/368 |
| 10,399,547 | B2 | * 9/2019 | Gaertner | B60T 17/02 |
| 2013/0062934 | A1 | * 3/2013 | Daher | B60T 7/042 303/10 |
| 2017/0057478 | A1 | * 3/2017 | Her | B60T 8/4068 |

* cited by examiner

*Primary Examiner* — Christopher P Schwartz
(74) *Attorney, Agent, or Firm* — Ladas & Parry, LLP

(57) ABSTRACT

Disclosed is a pulsation damping device of a hydraulic brake system including a first damper having a first damping chamber whose volume is varied by the hydraulic pressure of the brake oil, and a second damper having a second damping chamber whose volume is varied by the hydraulic pressure of the brake oil, wherein the volume change rate of the first damping chamber relative to the hydraulic pressure of the brake oil is provided to be larger than the volume change rate of the second damping chamber, and the hydraulic pressure of the corresponding brake oil in the first damping chamber when reaching the maximum variable volume is provided to be smaller than the hydraulic pressure of the corresponding brake oil in the second damping chamber when reaching the maximum variable volume.

20 Claims, 10 Drawing Sheets

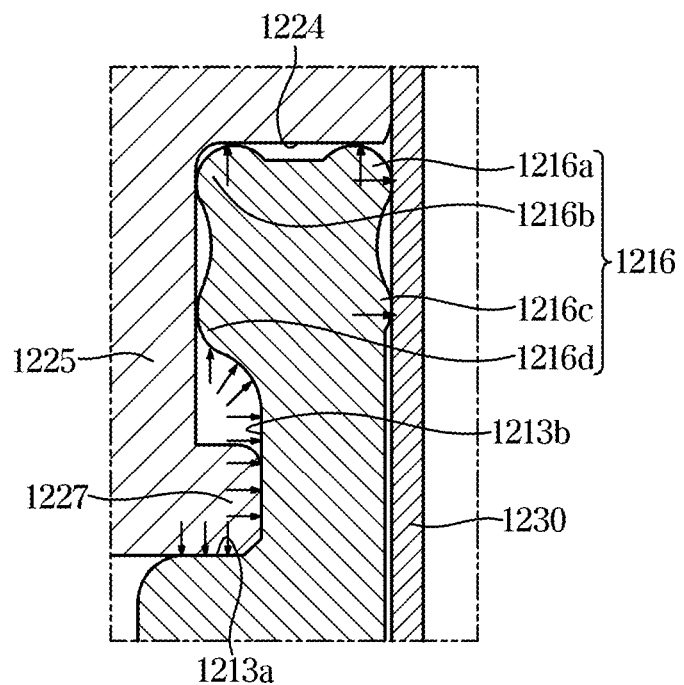

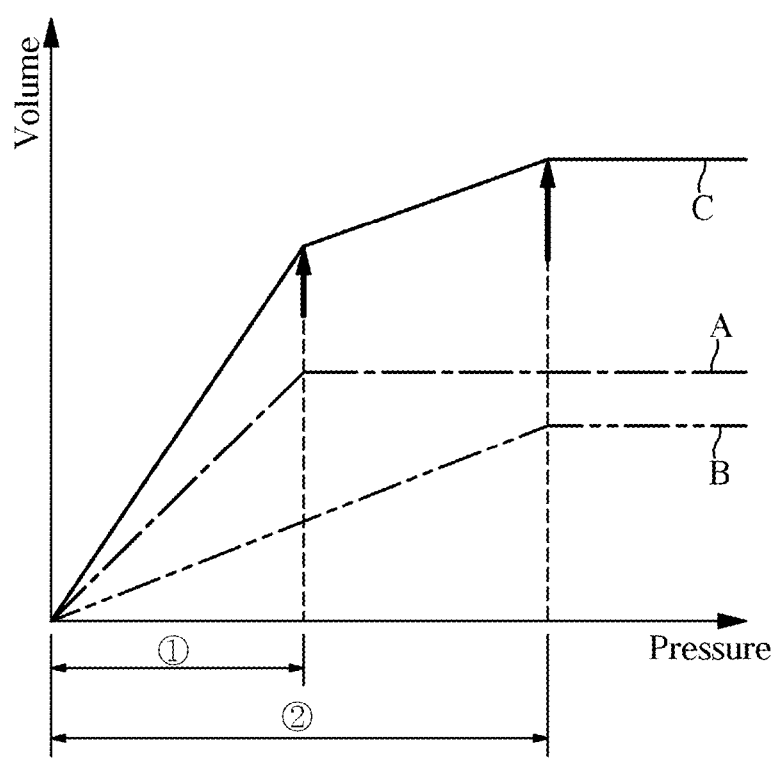

PULSATION DAMPING DEVICE OF HYDRAULIC BRAKE SYSTEM

CROSS-REFERENCE TO RELATED APPLICATION(S)

This application is based on and claims priority under 35 U.S.C. § 119 to Korean Patent Application No. 10-2018-0029560, filed on Mar. 14, 2018 and Korean Patent Application No. 10-2018-0029781, filed on Mar. 14, 2018 in the Korean Intellectual Property Office, the disclosures of which are incorporated by reference herein in their entireties.

BACKGROUND

1. Technical Field

The present disclosure relates to a pulsation damping device of a hydraulic brake system, and more particularly, to a pulsation damping device of a hydraulic brake system capable of effectively damping pressure pulsation of brake oil discharged from a pump.

2. Description of the Related Art

Generally, a hydraulic brake system includes a modulator block and an electronic control unit (ECU) in order to control the braking hydraulic pressure transmitted to a brake side of a vehicle. The modulator block is provided with a plurality of solenoid valves, an accumulator for temporarily storing brake oil, a pump for pressurizing and discharging the brake oil stored in the accumulator, and a motor for driving the pump, and the ECU electrically actuates and controls the components installed in the modulator block.

In the hydraulic brake system, pressure pulsation occurs due to the hydraulic pressure of the brake oil discharged from the pump, and the pressure pulsation causes noise and vibration, which deteriorates the operation feeling of a driver and affects the operational stability and reliability of the hydraulic brake system.

SUMMARY

It is an aspect of the present disclosure to provide a pulsation damping device of a hydraulic brake system capable of effectively damping pressure pulsation in various pressure ranges of brake oil.

It is an aspect of the present disclosure to provide a pulsation damping device of a hydraulic brake system capable of effectively reducing and suppressing noise and vibration from occurring.

It is an aspect of the present disclosure to provide a pulsation damping device of a hydraulic brake system capable of improving the operation feeling of a driver.

It is an aspect of the present disclosure to provide a pulsation damping device of a hydraulic brake system capable of improving structural stability and operational reliability.

It is an aspect of the present disclosure to provide a pulsation damping device of a hydraulic brake system that is simple in structure and easy to mount and install.

Additional aspects of the present disclosure will be set forth in part in the description which follows and, in part, will be obvious from the description, or may be learned by practice of the present disclosure.

In accordance with an aspect of the present disclosure, a pulsation damping device of a hydraulic brake system which attenuates a pressure pulsation of brake oil discharged from a pump, may include a first damper having a first damping chamber whose volume is varied by the hydraulic pressure of the brake oil, and a second damper having a second damping chamber whose volume is varied by the hydraulic pressure of the brake oil, wherein the volume change rate of the first damping chamber relative to the hydraulic pressure of the brake oil is provided to be larger than the volume change rate of the second damping chamber, and the hydraulic pressure of the corresponding brake oil in the first damping chamber when reaching the maximum variable volume is provided to be smaller than the hydraulic pressure of the corresponding brake oil in the second damping chamber when reaching the maximum variable volume.

The first damper may further include a first damping member having the first damping chamber formed therein, a first stopper member coupled to the first damping member and having a first flow passage communicating a hydraulic passage through which the brake oil flows to the first damping chamber, and a first sleeve surrounding the first damping member and coupled to the first stopper member, and the second damper may further include a second damping member having the second damping chamber formed therein, a second stopper member coupled to the second damping member and having a second flow passage communicating a hydraulic passage through which the brake oil flows to the second damping chamber, and a second sleeve surrounding the second damping member and coupled to the second stopper member.

At least one first concave-convex portion may be provided on an outer circumferential surface of the first damping member, at least one second concave-convex portion may be provided on an outer circumferential surface of the second damping member, a first auxiliary damping chamber may be formed between the first concave-convex portion and the first sleeve, and a second auxiliary damping chamber may be formed between the second concave-convex portion and the second sleeve.

The first damping member may include a first coupling portion formed in a hollow shape on an inlet/outlet side of the first damping chamber and coupled to the first stopper member, the first stopper member may include a first insertion portion coupled to an inner circumferential surface of the first coupling portion, and a first cap portion closing a first bore on which the first sleeve is mounted and coupled to an inner circumferential surface of the first sleeve, the second damping member may include a second coupling portion formed in a hollow shape on an inlet/outlet side of the second damping chamber and coupled to the second stopper member, and the second stopper member may include a second insertion portion coupled to an inner circumferential surface of the second coupling portion and a second cap portion coupled to an inner circumferential surface of the second sleeve.

The first stopper member may further include a first coupling groove formed to be recessed on an outer circumferential surface of the first insertion portion, the first damping member may further include a first sealing portion provided on the first coupling portion and entering and seated in the first coupling groove, the second stopper member may further include a second coupling groove formed to be recessed on an outer circumferential surface of the second insertion portion, and the second damping member may further include a second sealing portion provided on the second coupling portion and entering and seated in the second coupling groove.

The variable volume amount of the first auxiliary damping chamber may be provided to be larger than the variable volume amount of the second auxiliary damping chamber.

The first damper may include a first damping member having the first damping chamber formed therein, the second damper may include a second damping member having the second damping chamber formed therein, and the thickness between an outer circumferential surface of the first damping member and an inner circumferential surface of the first damping chamber may be provided to be smaller than the thickness between an outer circumferential surface of the second damping member and an inner circumferential surface of the second damping chamber.

The first damper may include a first damping member having the first damping chamber formed therein, the second damper may include a second damping member having the second damping chamber formed therein, and the ratio of the volume of the first damping chamber to the volume of the first damping member may be provided to be greater than the ratio of the volume of the second damping chamber to the volume of the second damping member.

The first damper may include a first damping member having the first damping chamber formed therein, the second damper may include a second damping member having the second damping chamber formed therein, and the elastic modulus of the first damping member may be provided to be smaller than the elastic modulus of the second damping member.

The first damper and the second damper may be arranged in series at a rear end portion of the pump.

The first damper and the second damper may be arranged in parallel at a rear end portion of the pump.

At least one of the first damping member and the second damping member may further include a sealing portion for preventing leakage of the brake oil entering the damping chamber, and the sealing portion may include protrusions that are urged in a direction to seal the damping chamber as the hydraulic pressure of the brake oil entering the damping chamber increases.

At least one of the first stopper member and the second stopper member may include an insertion portion protruding toward the damping chamber and guiding the brake oil transferred along the flow passage to the damping chamber, a flange portion provided at a lower portion of the insertion portion and having a larger diameter than the insertion portion, and a step portion provided at an upper portion of the insertion portion and facing and upper surface of the sealing portion, and the sealing portion may be disposed between the flange portion and the step portion.

At least one of the first damping member and the second damping member may further include flange fastening portions provided at a lower portion of the sealing portion and in which the flange portion is fitted.

The flange fastening portions may include a first flange fastening portion provided to be in contact with a bottom surface of the flange portion and a second flange fastening portion provided to be in contact with a side surface of the flange portion.

The protrusions may include an inner protrusions may be provided to face one surface of the insertion portion and an outer protrusions provided to face one surface of the first sleeve, and an inner radius of the inner protrusions may be provided to be smaller than an inner radius of the flange fastening portions.

The inner protrusions may include an upper inner protrusion provided to be in contact with a lower surface of the step portion and an outer surface of the insertion portion and a lower inner protrusion provided to be spaced apart from a lower portion of the upper inner protrusion and in contact with the outer surface of the insertion portion, and the outer protrusions may include an upper outer protrusion provided to be in contact with the lower surface of the step portion and an inner surface of the sleeve and a lower outer protrusion provided to be spaced apart from a lower portion of the lower inner protrusion and in contact with an outer surface of the sleeve.

The protrusions may be provided in an X-shape symmetrical in the left-right direction.

The protrusions may be elastically deformed by being pressed toward the sleeve or the stopper member by the hydraulic pressure of the brake oil that has entered the damping chamber.

At least one of the first sleeve and the second sleeve may include an accommodating portion into which the damping member is inserted, and a fastening portion coupled to the stopper member in a forced fit manner.

BRIEF DESCRIPTION OF THE DRAWINGS

These and/or other aspects of the present disclosure will become apparent and more readily appreciated from the following description of the embodiments, taken in conjunction with the accompanying drawings of which:

FIG. 9 is an enlarged view of the portion B in FIG. 7, illustrating a state in which hydraulic pressure has entered the second damping chamber; and FIG. 10 is a graph illustrating a change in volume per hydraulic pressure of brake oil in a first damping chamber and a second damping chamber according to an embodiment of the present disclosure.

DETAILED DESCRIPTION

Hereinafter, embodiments of the present disclosure will be described in detail with reference to the accompanying drawings. The embodiments described below are provided by way of example so that those skilled in the art may be able to fully understand the spirit of the present disclosure. The present disclosure is not limited to the embodiments described below, but may be embodied in other forms. In order to clearly illustrate the present disclosure, parts not related to the description are omitted from the drawings, and the size of the components may be slightly exaggerated to facilitate understanding.

Figure 1:
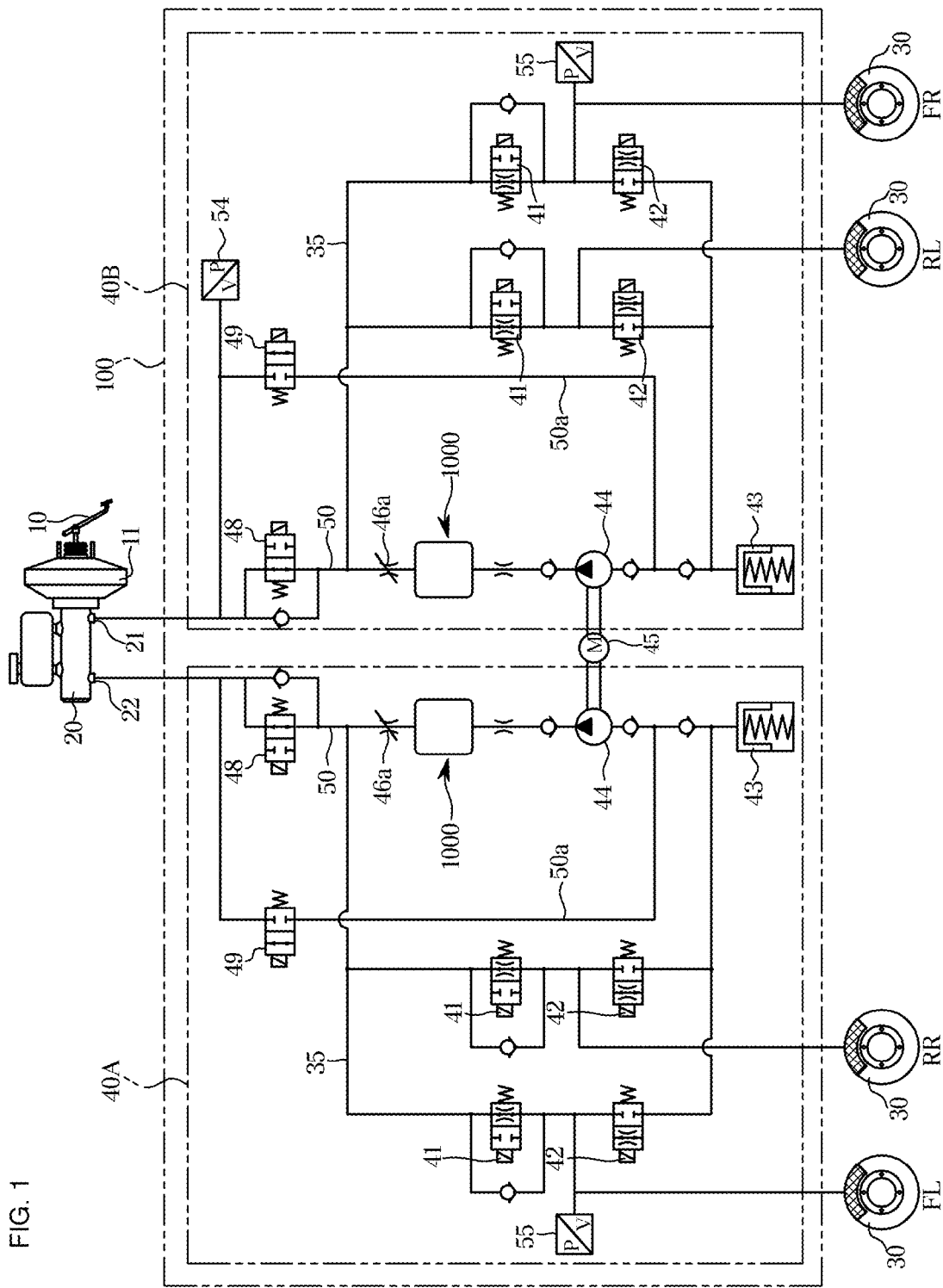
FIG. 1 is a hydraulic circuit diagram schematically illustrating a hydraulic brake system.

FIG. 1 is a hydraulic circuit diagram schematically illustrating a hydraulic brake system to which a pulsation damping device according to an embodiment of the present disclosure is applicable.

Referring to FIG. 1, a hydraulic brake system to which a pulsation damping device 1000 according to an embodiment of the present disclosure is applicable includes a valve block 100 in which hydraulic circuits 40A and 40B for controlling to transmit braking hydraulic pressure generated through a booster 11 and a master cylinder 20 connected with a brake pedal 10 to wheel cylinders 30 provided on respective wheels FL, FR, RL, and RR are formed. The hydraulic circuits 40A and 40B include the first hydraulic circuit 40A for connecting a first port 21 of the master cylinder 20 and the wheel cylinders 30 provided on two of the wheels FR and RL to control the delivery of hydraulic pressure, and the second hydraulic circuit 40B for connecting a second port 22 of the master cylinder 20 and the wheel cylinders 30 provided on two of the other wheels FL and RR to control the delivery of hydraulic pressure. The first and second hydraulic circuits 40A and 40B are provided compactly in the valve block 100.

The first hydraulic circuit 40A and the second hydraulic circuit 40B each include a plurality of solenoid valves 41 and 42 for controlling braking hydraulic pressure transmitted to two of the wheel cylinders 30, a low-pressure accumulator 43 for temporarily storing oil that has escaped from the wheel cylinders 30, one of a pair of pumps 44 for pressurizing and discharging oil from the low-pressure accumulator 43 or the master cylinder 20, a motor 45 for driving the pair of pumps 44, a drive force control valve 48 and a shuttle valve 49 for controlling the flow of oil, hydraulic flow passages 50 and 50a for selectively transmitting hydraulic pressure discharged from the pump 44 or the hydraulic pressure generated from the master cylinder 20 to the wheel cylinders 30 or a suction side of the pump 44, and a port connection passage 35 branched from the hydraulic flow passage 50 connecting an orifice 46a and the drive force control valve 48.

That is, as illustrated in the drawing, the plurality of solenoid valves 41 and 42, the low-pressure accumulator 43, the pumps 44, the drive force control valve 48, the shuttle valve 49, the hydraulic flow passages 50 and 50a, the port connection passage 35, and the like are provided compactly in the valve block 100 to constitute the first and second hydraulic circuits 40A and 40B.

More specifically, the plurality of solenoid valves 41 and 42 are classified into the normally open type (NO type) solenoid valve 41 (hereinafter referred to as 'NO valve') connected to an upstream side of the wheel cylinders 30 and kept in a normally open state, and a normally closed type (NC type) solenoid valve 42 (hereinafter referred to as 'NC valve') connected to a downstream side of the wheel cylinders 30 and kept in a normally closed state. The opening and closing operations of the NO and NC valves 41 and 42 are controlled by an electronic control unit (not shown) that detects a vehicle speed through a wheel sensor (not shown) disposed on each of the wheels FL, FR, RL, and RR, respectively.

A bypass passage 50a, which is branched from the hydraulic flow passage 50 connecting an outlet side of the master cylinder 20 to the pulsation damping device 1000 of the hydraulic brake system that will be described later and the drive force control valve 48 and connected to an inlet side of the pump 44, is provided, and the bypass passage 50a is provided with a shuttle valve (ESV) 49 that is kept in a normally closed state and is opened in response to an open signal. That is, the bypass passage 50a guides the brake oil in the master cylinder 20 to be sucked into an inlet of the pump 44 according to the opening and closing operation of the shuttle valve 49.

The drive force control valve (TC NO valve) 48 is provided on the hydraulic flow passage 50 between the outlet side of the master cylinder 20 and an orifice 46a that is formed an outlet side of the pulsation damping device 1000 of the hydraulic brake system that will be described later. The drive force control valve 48 is kept in a normally open state and doses the hydraulic flow passage 50 when a road surface slip of a wheel occurs due to a sudden start of a vehicle or the like, so that the braking hydraulic pressure generated by the driving of the pump 44 may be transmitted to the wheel cylinders 30 of the wheels FL and RR or RL and FR. Thus, even when the driver does not step on the brake pedal 10, the braking of the vehicle may be performed.

The port connection passage 35 is branched from the hydraulic flow passage 50 connecting a discharge side of the orifice 46a and the drive force control valve 48. The port connection passage 35 is connected to the wheel cylinders 30 of the wheels FL and RR or RL and FR via the NO valve 41 and the NC valve 42. Unexplained reference numerals 54 and 55 are a cylinder pressure sensor provided for measuring the hydraulic pressure generated from the master cylinder 20 and wheel pressure sensors for detecting the hydraulic pressure transmitted to the wheel cylinders 30, respectively. A pair of the wheel pressure sensors 55 each are provided on the first and second hydraulic circuits 40A and 40B.

In the hydraulic brake system as described above, pressure pulsation is generated from the hydraulic pressure that is pressurized and discharged by the pumps 44 in accordance with the operation of the motor 45 during braking, and the pressure pulsation causes noise and vibration, which deteriorates the operation feeling of a driver and affects the operational stability and reliability of the hydraulic brake system.

Particularly, the pressure pulsation gradually increases as the hydraulic pressure pressurized by the pumps 44 increases and develops in a very irregular manner, and thus pressure pulsation of different sizes occurs in various pressure ranges. Accordingly, the pulsation damping device 1000 of the hydraulic brake system according to an embodiment of the present disclosure is provided to effectively attenuate pressure pulsation in various pressure ranges.

The hydraulic brake system illustrated in FIG. 1 is only an example for facilitating understanding of the present disclosure, and the pulsation damping device 1000 of the hydraulic brake system according to an embodiment of the present disclosure is not limitedly applied to the hydraulic brake system illustrated in FIG. 1. Therefore, it will be understood that if pressure pulsation is generated in the hydraulic brake system that performs braking by hydraulic pressure and it is required to reduce the pressure pulsation, the pulsation damping device 1000 of the hydraulic brake system according to an embodiment of the present disclosure may be applied to hydraulic brake systems of various structures and methods.

The pulsation damping device 1000 includes a first damper 1100 and a second damper 1200 so as to effectively reduce pressure pulsation in various pressure ranges.

Figure 2:
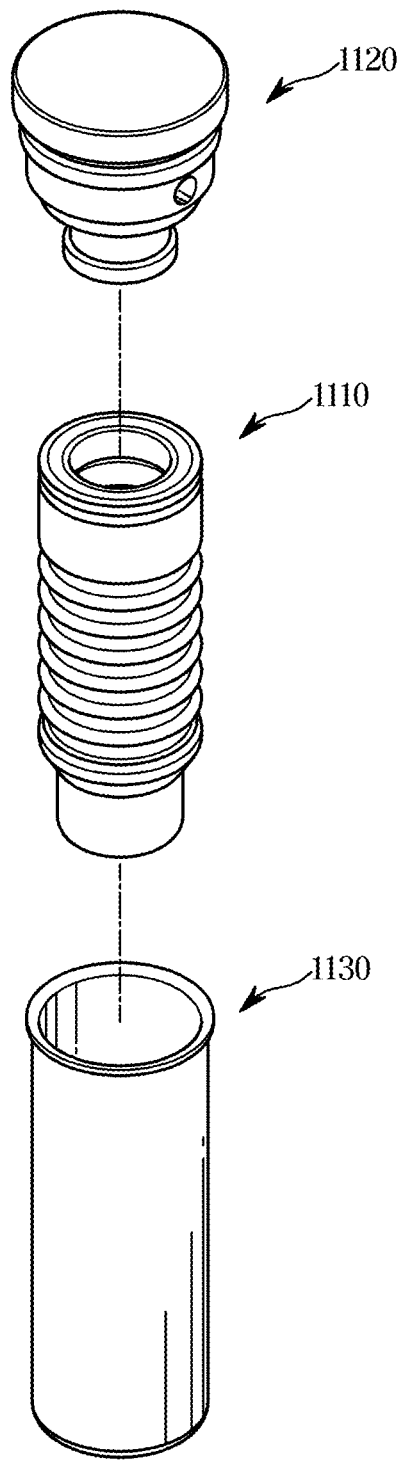
FIG. 2 is an exploded perspective view illustrating a first damper of a pulsation damping device according to an embodiment of the present disclosure.
Figure 3:
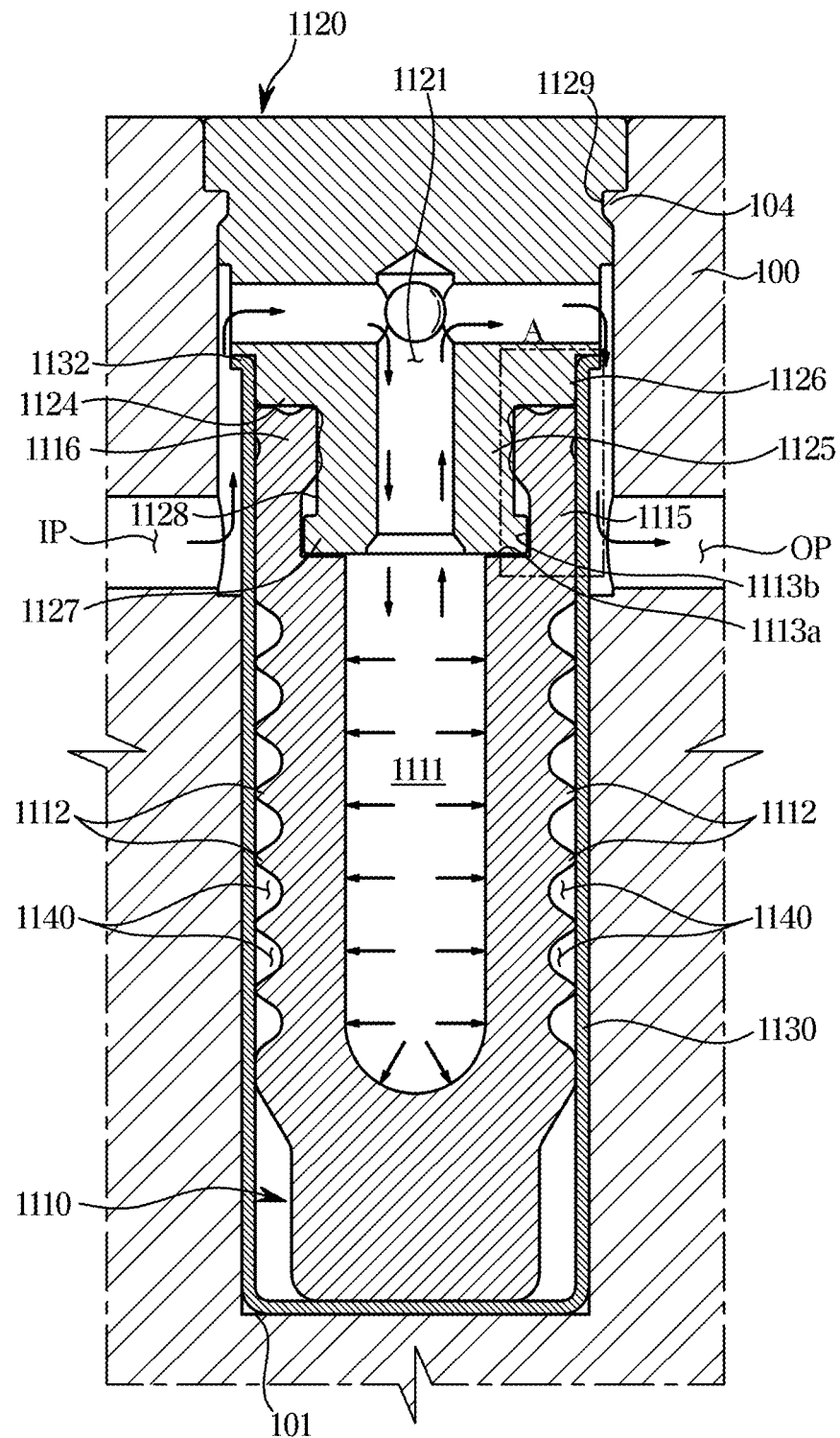
FIG. 3 is a cross-sectional view illustrating a first damper of a pulsation damping device according to an embodiment of the present disclosure, which shows the flow of brake oil in which pressure pulsation is attenuated through the first damper.

FIG. 2 is an exploded perspective view illustrating the first damper 1100 of the pulsation damping device 1000 of a hydraulic brake system according to an embodiment of the present disclosure, and FIG. 3 is a cross-sectional view illustrating the first damper 1100 of the pulsation damping device 1000 of a hydraulic brake system according to an embodiment of the present disclosure, which shows the flow of brake oil in which pressure pulsation is attenuated through the first damper 1100.

The first damper 1100 according to an embodiment of the present disclosure is provided to attenuate the pressure pulsation of brake oil in a first pressure range ①.

Referring to FIGS. 2 and 3, the first damper 1100 is provided in a first bore 101 communicating with an inlet port IP through which the brake oil discharged from the pump 44 is introduced and an outlet port OP through which the brake oil is discharged. That is, the inlet port IP refers to a point connected to a flow passage of the direction through which the brake oil is introduced in reference to the first damper 1100, and the outlet port OP refers to a point connected to a flow passage of the direction through which the brake oil is discharged in reference to the first damper 1100.

The first damper 1100 includes a first damping member 1110 having a first damping chamber 1111 formed therein, a first stopper member 1120 which is fitted in the first damping member 1110 and closes an opening of the first bore 101, and a first sleeve 1130 which surrounds the first damping member 1110 and is coupled to the first stopper member 1120.

The first damping member 1110 may be formed in a cylindrical shape with one end opened to form the first damping chamber 1111 therein. The first damping member 1110 may be inserted into the first bore 101 in a state of being accommodated in the first sleeve 1130, which will be described later, and may be provided such that a plurality of first concave-convex portions 1112 are formed on an outer circumferential surface thereof. The first concave-convex portions 1112 may be continuously arranged with alternating concave and convex portions, and thus when the first damping member 1110 and the first sleeve 1130 are coupled to each other, first auxiliary damping chambers 1140 are formed between an inner circumferential surface of the first sleeve 1130 and the first concave-convex portions 1112. The first concave-convex portions 1112 and the first auxiliary damping chambers 1140 will be described in detail later.

The first damping chamber 1111 formed inside the first damping member 1110 is provided such that the volume thereof may be varied by the hydraulic pressure of the brake oil that is introduced into and discharged from the first damping chamber 1111. To this end, the first damping member 1110 may be made of an elastically deformable material, and more specifically, a material having a level of elastic restoring force of a first elastic modulus. A detailed description thereof will be given later with the second damper 1200, which will be described later.

The first damping member 1110 may include a first coupling portion 1115 formed in a hollow shape on an inlet/outlet side of the first damping chamber 1111 and coupled to the first stopper member 1120. The first coupling portion 1115 is coupled to a first insertion portion 1125 of the first stopper member 1120, which will be described later, so that the first damping member 1110 and the first stopper member 1120 may be coupled to each other. A first sealing portion 1116 that seals the first damping chamber 1111 and the outside of the first damping member 1110 by entering and being seated in a first coupling groove 1128, which will be described later, may be provided at an upper end of the first coupling portion 1115. The first sealing portion 1116 is provided to be in close contact with the first coupling groove 1128 and the first sleeve 1130 so that the brake oil entering the first damping chamber 1111 may be prevented from leaking between the first damping member 1110 and the first stopper member 1120, and at the same time may be prevented from leaking to the first auxiliary damping chambers 1140, which will be described later. The first sealing portion 1116 includes a plurality of first protrusions 1116a, 1116b, 1116c, and 1116d that are urged in a direction to seal the first damping chamber 1111 depending on the hydraulic pressure of the brake oil entering the first damping chamber 1111. A detailed description thereof will be given later.

Flange fastening portions 1113a and 1113b in which a first flange portion 1127 of the first stopper member 1120 is fitted, which will be described later, may be provided at a lower portion of the first sealing portion 1116 of the first damping member 1110. The flange fastening portions 1113a and 1113b may include the first-1 flange fastening portion 1113a in contact with a bottom surface of the first flange portion 1127, and the first-2 flange fastening portion 1113b in contact with a side surface of the first flange portion 1127. As such, the flange fastening portions 1113a and 1113b are formed to be recessed in an inner circumferential surface of the first damping member 1110 facing the first flange portion 1127 so that the first damping member 1110 may be stably coupled to the first stopper member 1120.

The first stopper member 1120 is provided to be coupled to the first damping member 1110 to close the opening of the first bore 101. The first stopper member 1120 may include a first flow passage 1121 for communicating the inlet port IP and the outlet port OP with the first damping chamber 1111. The first stopper member 1120 may also include the first insertion portion 1125 coupled to the first damping member 1110, a first step portion 1124 provided at an upper portion of the first insertion portion 1125 and facing an upper end surface of the first sealing portion 1116, the first flange portion 1127 provided at a lower portion of the first insertion portion 1125 and having a larger diameter than the first insertion portion 1125, and a first cap portion 1126 that closes the first bore 101 into and on which the first sleeve 1130 is inserted and mounted and is coupled to the first sleeve 1130.

The first stopper member 1120 and the first damping member 1110 may be coupled to each other by inserting the first insertion portion 1125 into the first coupling portion 1115 of the first damping member 1110. The first insertion portion 1125 may be coupled to the first coupling portion 1115 by closely contacting an outer circumferential surface of the first insertion portion 1125 with an inner circumferential surface of the first coupling portion 1115. The first coupling groove 1128 in which the first sealing portion 1116 of the first coupling portion 1115 is seated may be provided on the outer circumferential surface of the first insertion portion 1125.

The first coupling groove 1128 may be formed to be recessed on the outer circumferential surface of the first insertion portion 1125. One of the first coupling groove 1128 may be continuously formed along the outer circumferential surface of the first insertion portion 1125 or a plurality of the first coupling grooves 1128 may be formed along the outer circumferential surface of the first insertion portion 1125. The first sealing portion 1116 of the first damping member 1110 may be inserted into and seated in the first coupling groove 1128, and thus the first stopper member 1120 and the first damping member 1110 are stably coupled to each other so that the brake oil in the first damping chamber 1111 may be prevented from leaking between the first damping member 1110 and the first stopper member 1120.

The first cap portion 1126 is provided to close the opening of the first bore 101. The first cap portion 1126 is provided with a first flow passage 1121 for communicating the inlet port IP and the outlet port OP with the first damping chamber 1111 and prevents the brake oil in the first bore 101 from leaking to the outside. The first flow passage 1121 is provided such that the inlet port IP and the outlet port OP are communicated with each other and also communicated with the first damping chamber 1111. The first cap portion 1126 may be inserted into the inner circumferential surface of the first sleeve 1130, which will be described later, to be coupled to the first sleeve 1130. As described above, the first insertion portion 1125 of the first stopper member 1120 is coupled to the first damping member 1110 and the first cap portion 1126 of the first stopper member 1120 is coupled to the first sleeve 1130 so that the first damping member 1110, the first stopper member 1120 and the first sleeve 1130 may act as a single assembly.

The first cap portion 1126 may be provided with a fixing groove 1129 formed to be recessed on an outer circumferential surface thereof so that the first cap portion 1126 is stably fixed to the block 100 while being prevented from being separated from the block 100 in which the first bore 101 is formed. Also, the first bore 101 may be provided with a fixing protrusion 104 formed to protrude from an inner circumferential surface thereof in a shape corresponding to the fixing groove 1129 and to be inserted into the fixing groove 1129.

The first sleeve 1130 may be provided to surround the first damping member 1110 and be press-fitted into the first cap portion 1126 of the first stopper member 1120. The first sleeve 1130 may be formed in a cylindrical shape with its lower end closed and include a first accommodating portion 1131 into which the first damping member 1110 is inserted, and a first fastening portion 1132 coupled to the first stopper member 1120 in a forced fit manner. The first damping member 1110 may be seated inside the first accommodating portion 1131, and the first auxiliary damping chambers 1140 may be formed between the first concave-convex portions 1112 of the first damping member 1110 and the inner circumferential surface of the first sleeve 1130. The first sleeve 1130 may be installed in the first bore 101 by press fitting. The first sleeve 1130 is also installed in the first bore 101 together with the first damping member 1110 inserted therein, so that the first damper 1100 may be easily assembled.

As the first sleeve 1130 is configured to contact and surround an outer surface of the first damping member 1110, the first auxiliary damping chambers 1140 are formed between the inner circumferential surface of the first sleeve 1130 and the first concave-convex portions 1112 of the first damping member 1110. That is, the concave portions of the first concave-convex portions 1112 are formed as the first auxiliary damping chambers 1140, so that the pressure pulsation due to the hydraulic pressure of a high pressure introduced from the inlet port IP is first attenuated through the first damping chamber 1111 and is secondarily attenuated through the first auxiliary damping chambers 1140, thereby effectively damping pressure pulsation in the first pressure range ①. At the same time, as the first sleeve 1130 is provided to surround the first damping member 1110, the durability of the first damping member 1110 may be improved.

Hereinafter, the operation in which the pressure pulsation of the brake oil is attenuated by the first damper 1100 according to an embodiment of the present disclosure will be described.

The brake oil discharged at a high pressure by the operation of the pump 44 is supplied to the first damper 1100 through the inlet port IP. As the brake oil introduced through the inlet port IP flows into the inside of the first damping member 1110 through the first flow passage 1121 formed in the first stopper member 1120, that is, into the inside of the first damping chamber 1111 so that the first damping member 1110 is elastically deformed, the brake oil is discharged to the outlet port OP after the pressure pulsation is attenuated. In this case, not only the pressure pulsation of the brake oil is attenuated by the elastic deformation of the first damping member 1110 itself because the first damping member 1110 is made of an elastically deformable material, but also the pressure pulsation may be more effectively attenuated because the deformable range of the first damping member 1110 is expanded by the first auxiliary damping chambers 1140 formed between the first sleeve 1130 and the first damping member 1110.

Hereinafter, the operation of sealing the first damping chamber 1111 by the first sealing portion 1116 will be described.

Figure 4:
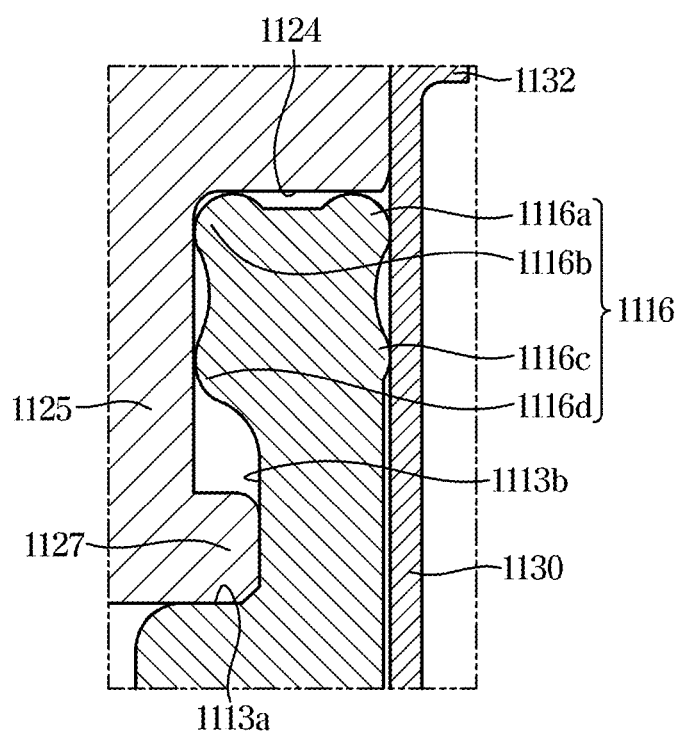
FIG. 4 is an enlarged view of a portion A in FIG. 3, illustrating a state before hydraulic pressure enters a first damping chamber.
Figure 5:
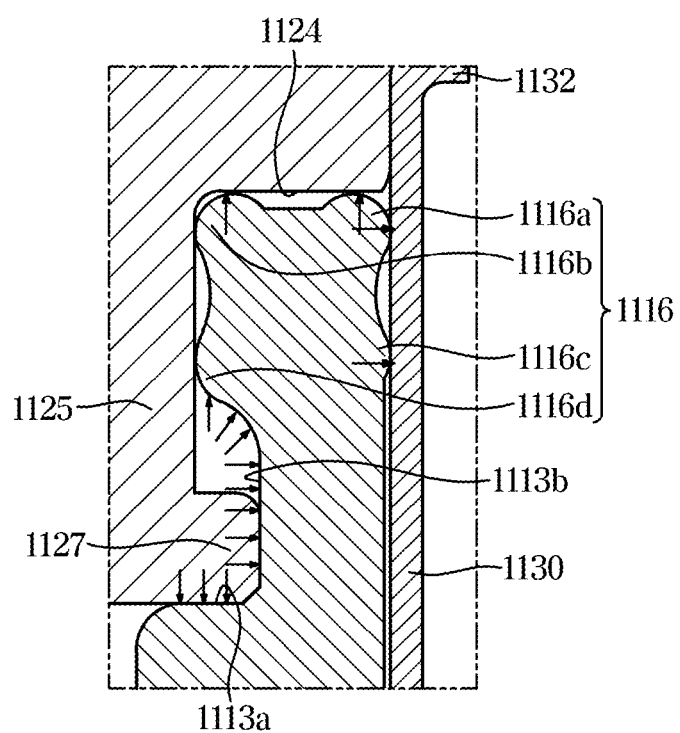
FIG. 5 is an enlarged view of the portion A in FIG. 3, illustrating a state in which hydraulic pressure has entered the first damping chamber.

FIGS. 4 and 5 are an enlarged view of a portion A in FIG. 3 and illustrate a state before hydraulic pressure enters the first damping chamber 1111 and a state in which hydraulic pressure has entered the first damping chamber 1111, respectively.

The first sealing portion 1116 includes the plurality of first protrusions 1116a, 1116b, 1116c, and 1116d that are disposed between the first flange portion 1127 and the first step portion 1124 and urged in a direction to seal the first damping chamber 1111 when the hydraulic pressure of a high pressure is applied to the first damping chamber 1111 by the brake oil.

The first protrusions 1116a, 1116b, 1116c and 1116d are elastically deformed by being urged toward the first sleeve 1130 or the first stopper member 1120 by an internal pressure of the first damping chamber 1111, so that deterioration in the sealing performance over time may be prevented. The first protrusions 1116a, 1116b, 1116c and 1116d may include the first inner protrusions 1116b and 1116d provided to face one surface of the first insertion portion 1125 and the first outer protrusions 1116a and 1116c provided to face one surface of the first sleeve 1130.

The first protrusions 1116a, 1116b, 1116c, and 1116d may be provided in an X shape that is symmetrical in the left-right direction. For example, the first inner protrusions 1116b and 1116d may be composed of the first upper inner protrusion 1116b provided to contact a lower surface of the first step portion 1124 and an outer surface of the first insertion portion 1125 and the first lower inner protrusion 1116d provided to be spaced below the first upper inner protrusion 1116b and contact the outer surface of the first insert portion 1125, and the first outer protrusions 1116a and 1116c may be composed of the first upper outer protrusion 1116a provided to contact the lower surface of the first step portion 1124 and an inner surface of the first sleeve 1130 and the first lower outer protrusion 1116c provided to be spaced below the first upper outer protrusion 1116a and contact the inner surface of the first sleeve 1130. The X-shaped first sealing portion 1116 is assembled between the first stopper member 1120 and the first sleeve 1130 and the side surfaces thereof may be pressed, thereby performing a sealing function.

When the first sealing portion 1116 is provided in an X shape that is symmetrical in the left-right direction, the sealing by the first protrusions 1116*a*, 1116*b*, 1116*c* and 1116*d* may be performed as follows. First, the brake oil infiltrates between the first flange portion 1127 and the first flange fastening portions 1113*a* and 1113*b* when the hydraulic pressure of a high pressure is applied to the brake oil. The infiltrated brake oil presses the first lower inner protrusion 1116*d* toward the first insertion portion 1125 and the first lower inner protrusion 1116*d* is elastically deformed by the pressing force, so that the sealing performance may be enhanced.

When the brake oil infiltrates between the first lower inner protrusion 1116*d* and the first insertion portion 1125 by the action of a high pressure which is higher than a pressure required for the sealing performance of the first lower inner protrusion 1116*d*, the infiltrated brake oil again presses the first upper inner protrusion 1116*b* toward the first insertion portion 1125 and the first step portion 1124 and the first upper inner protrusion 1116*b* is elastically deformed by the pressing force, so that the sealing performance may be enhanced.

When the brake oil infiltrates between the first upper inner protrusion 1116*b*, the first insertion portion 1125 and the first step portion 1124 by the action of a high pressure which is higher than a pressure required for the sealing performance of the first upper inner protrusion 1116*b*, the infiltrated brake oil again presses the first upper outer protrusion 1116*a* toward the first step portion 1124 and the first sleeve 1130 and the first upper outer protrusion 1116*a* is elastically deformed by the pressing force, so that the sealing performance may be enhanced.

When the brake oil infiltrates between the first upper outer protrusion 1116*a*, the first step portion 1124 and the first sleeve 1130 by the action of a high pressure which is higher than a pressure required for the sealing performance of the first upper outer protrusion 1116*a*, the infiltrated brake oil again presses the first lower outer protrusion 1116*c* toward the first sleeve 1130 and the first lower outer protrusion 1116*c* is elastically deformed by the pressing force, so that the sealing performance may be enhanced.

As such, the first damping member 1120 having the X-shaped first sealing portion 1116 may prevent deterioration in sealing performance over time. This is possible by providing the inner radius of the cross section of the first inner protrusions 1116*b* and 1116*d* to be smaller than the inner radius of the first-2 flange fastening portion 1113*b* so that when the hydraulic pressure acts, a force is applied to the first inner protrusions 1116*b* and 1116*d* toward the first step portion 1124 and a force is applied to the first outer protrusions 1116*a* and 1116*c* in a direction to widen toward the first sleeve 1130. That is, as the first flange portion 1127 is arranged to be inserted between the first inner protrusions 1116*b* and 1116*d* and the first-1 flange fastening portion 1113*a*, the sealing performance may be enhanced and maintained by applying the hydraulic pressure in the direction in which the brake oil flowing along the outer surface of the first flange portion 1127 seals the first damping chamber 1111.

Hereinafter, the second damper 1200 according to an embodiment of the present disclosure will be described.

Figure 6:
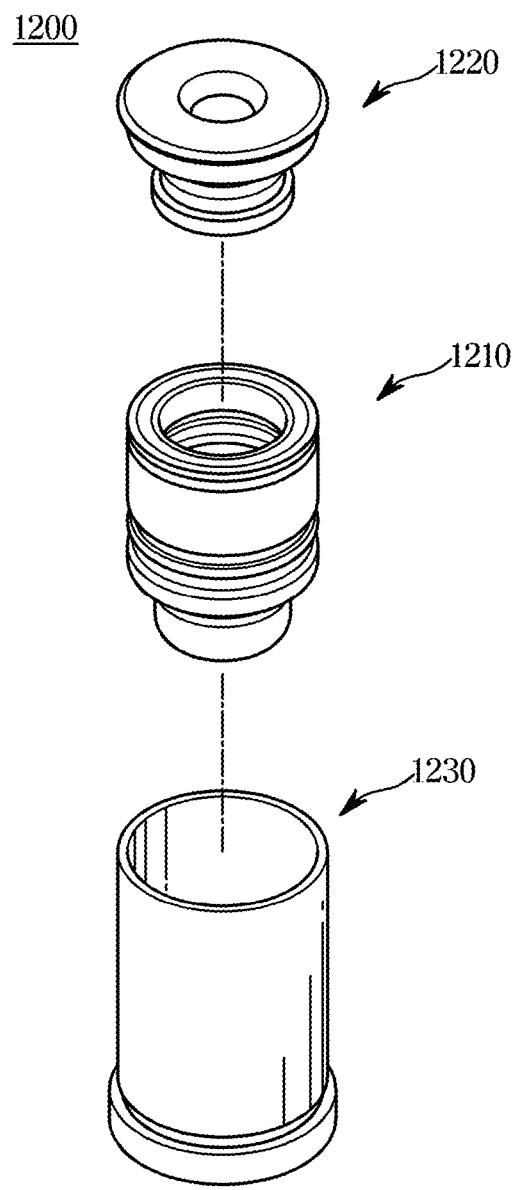
FIG. 6 is an exploded perspective view illustrating a second damper of a pulsation damping device according to an embodiment of the present disclosure.
Figure 7:
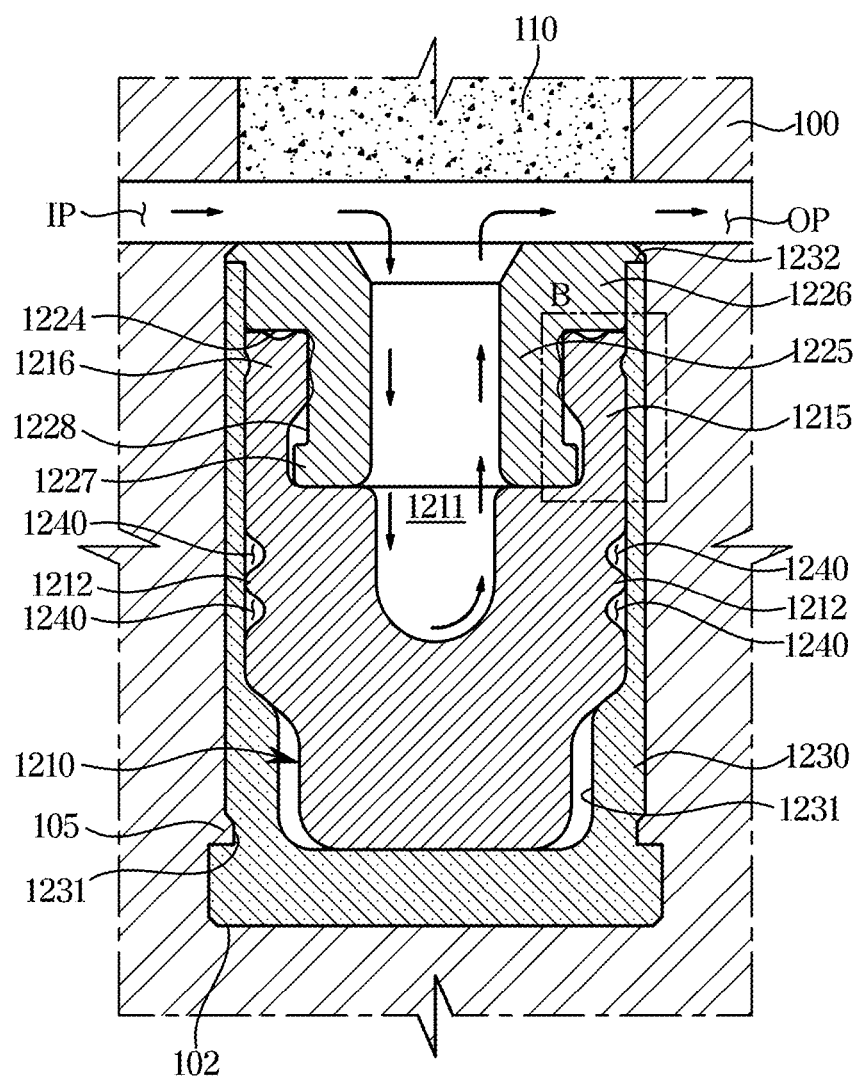
FIG. 7 is a cross-sectional view illustrating a second damper of a pulsation damping device according to an embodiment of the present disclosure, which shows the flow of brake oil in which pressure pulsation is attenuated through the second damper.

FIG. 6 is an exploded perspective view illustrating the second damper 1200 of the pulsation damping device 1000 according to an embodiment of the present disclosure, and FIG. 7 is a cross-sectional view illustrating the second damper 1200 of the pulsation damping device 1000 according to an embodiment of the present disclosure, which shows the flow of the brake oil in which pressure pulsation is attenuated through the second damper 1200.

The second damper 1200 according to an embodiment of the present disclosure is provided to attenuate the pressure pulsation of brake oil in a second pressure range ②. The second pressure range ② refers to a pressure range in which at least a part of the range is different from the first pressure range ① in which the pressure pulsation is reduced by the first damper 1100. A detailed description thereof will be given later with reference to FIG. 10.

Referring to FIGS. 6 and 7, the second damper 1200 is provided in a second bore 102 communicating with the inlet port IP through which the brake oil supplied from the pump 44 or via the first damper 1100 is introduced and the outlet port OP through which the brake oil is discharged. That is, the inlet port IP refers to a point connected to a flow passage of the direction through which the brake oil is introduced in reference to the second damper 1200, and the outlet port OP refers to a point connected to a flow passage of the direction through which the brake oil is discharged in reference to the second damper 1200.

The second damper 1200 includes a second damping member 1210 having a second damping chamber 1211 formed therein, a second stopper member 1220 which is fitted in the second damping member 1210, and a second sleeve 1230 which surrounds the second damping member 1210 and is coupled to the second stopper member 1220.

The second damping member 1210 may be formed in a cylindrical shape with one end opened to form the second damping chamber 1211 therein. The second damping member 1210 may be inserted into the second bore 102 in a state of being accommodated in the second sleeve 1230, which will be described later, and may be provided such that a plurality of second concave-convex portions 1212 are formed on an outer circumferential surface thereof. The second concave-convex portions 1212 may be continuously arranged with alternating concave and convex portions, and thus when the second damping member 1210 and the second sleeve 1230 are coupled to each other, second auxiliary damping chambers 1240 are formed between an inner circumferential surface of the second sleeve 1230 and the second concave-convex portions 1212. The second concave-convex portions 1212 and the first concave-convex portions 1112 may be provided so that at least one of the number and shape is different from each other. The second concave-convex portions 1212 and the second auxiliary damping chambers 1240 will be described in detail later.

The second damping chamber 1211 formed inside the second damping member 1210 is provided such that the volume thereof may be varied by the hydraulic pressure of the brake oil that is introduced into and discharged from the second damping chamber 1211. To this end, the second damping member 1210 may be made of an elastically deformable material, and more specifically, a material having a level of elastic restoring force of a second elastic modulus. A detailed description thereof will be given later in comparison with the first damper 1100.

The second damping member 1210 may include a second coupling portion 1215 formed in a hollow shape on an inlet/outlet side of the second damping chamber 1211 and coupled to the second stopper member 1220. The second coupling portion 1215 is coupled to a second insertion portion 1225 of the second stopper member 1220, which will be described later, so that the second damping member 1210 and the second stopper member 1220 may be coupled to each other. A second sealing portion 1216 that seals the second damping member 1210 and the outside of the second damping chamber 1211 by entering and being seated in a second coupling groove 1228, which will be described later, may be provided at an upper end of the first coupling portion 1115. The second sealing portion 1216 is provided to be in close contact with the second coupling groove 1228 and the second sleeve 1230 so that the brake oil entering the second damping chamber 1211 may be prevented from leaking between the second damping member 1210 and the second stopper member 1220, and at the same time may be prevented from leaking to the second auxiliary damping chambers 1240, which will be described later. The second sealing portion 1216 includes a plurality of second protrusions 1216*a*, 1216*b*, 1216*c*, and 1216*d* that are urged in a direction to seal the second damping chamber 1211 depending on the hydraulic pressure of the brake oil entering the second damping chamber 1211. A detailed description thereof will be given later.

Flange fastening portions 1213*a* and 1213*b* in which a second flange portion 1227 of the second stopper member 1220 is fitted, which will be described later, may be provided at a lower portion of the second sealing portion 1216 of the second damping member 1210. The flange fastening portions 1213*a* and 1213*b* may include the second-1 flange fastening portion 1213*a* in contact with a bottom surface of the second flange portion 1227, and the second-2 flange fastening portion 1213*b* in contact with a side surface of the second flange portion 1227. As such, the flange fastening portions 1213*a* and 1213*b* are formed to be recessed in an inner circumferential surface of the second damping member 1210 facing the second flange portion 1227 so that the second damping member 1210 may be stably coupled to the second stopper member 1220.

The second stopper member 1220 is provided to be coupled to the second damping member 1210 to communicate the second bore 102 and the second damping chamber 1211. To this end, the second stopper member 1220 may include a second flow passage 1221 for communicating the inlet port IP and the outlet port OP with the second damping chamber 1211. The second stopper member 1220 may also include the second insertion portion 1225 coupled to the second damping member 1210, a second step portion 1224 provided at an upper portion of the second insertion portion 1225 and facing an upper end surface of the second sealing portion 1216, the second flange portion 1227 provided at a lower portion of the second insertion portion 1225 and having a larger diameter than the second insertion portion 1225, and a second cap portion 1226 which is inserted into the second sleeve 1230 to be coupled to the second sleeve 1230.

The second stopper member 1220 and the second damping member 1210 may be coupled to each other by inserting the second insertion portion 1225 into the second coupling portion 1215 of the second damping member 1210. The second insertion portion 1225 may be coupled to the second coupling portion 1215 by closely contacting an outer circumferential surface of the second insertion portion 1225 with an inner circumferential surface of the second coupling portion 1215. The second coupling groove 1228 in which the second sealing portion 1216 of the second coupling portion 1215 is seated may be provided on the outer circumferential surface of the second insertion portion 1225.

The second coupling groove 1228 may be formed to be recessed on the outer circumferential surface of the second insertion portion 1225. One of the second coupling groove 1228 may be formed continuously along the outer circumferential surface of the second insertion portion 1225 or a plurality of the second coupling grooves 1228 may be formed along the outer circumferential surface of the second insertion portion 1225. The second sealing portion 1216 of the second damping member 1210 may be inserted into and seated in the second coupling groove 1228, and thus the second stopper member 1220 and the second damping member 1210 are stably coupled to each other so that the brake oil in the second damping chamber 1211 may be prevented from leaking between the second damping member 1210 and the second stopper member 1220.

The second cap portion 1226 is provided to be coupled to the second sleeve 1230 and be mounted on the opening of the second bore 102. The second cap portion 1226 is provided with a second flow passage 1221 for communicating the inlet port IP and the outlet port OP with the second damping chamber 1211 and prevents the brake oil in the second bore 102 from leaking to the outside. The first flow passage 1121 is provided such that the inlet port IP and the outlet port OP are communicated with each other and also communicated with the first damping chamber 1111. The second cap portion 1226 may be inserted into the inner circumferential surface of the second sleeve 1230, which will be described later, to be coupled to the second sleeve 1230. The second flow passage 1221 is provided such that the inlet port IP and the outlet port OP are communicated with each other and are also communicated with the second damping chamber 1211. As described above, the second insertion portion 1225 of the second stopper member 1220 is coupled to the second damping member 1210 and the second cap portion 1226 of the second stopper member 1220 is coupled to the second sleeve 1230 so that the second damping member 1210, the second stopper member 1220 and the second sleeve 1230 may act as a single assembly.

The second sleeve 1230 may be provided to surround the second damping member 1210 and be press-fitted into the second cap portion 1226 of the second stopper member 1220. The second sleeve 1230 may be formed in a cylindrical shape with its lower end closed and include a second accommodating portion 1231 into which the second damping member 1210 is inserted, and a second fastening portion 1232 coupled to the second stopper member 1220 in a forced fit manner. The second damping member 1210 may be seated inside the second accommodating portion 1231, and the second auxiliary damping chambers 1240 may be formed between the second concave-convex portions 1212 of the second damping member 1210 and the inner circumferential surface of the second sleeve 1230. The second sleeve 1230 may be installed in the second bore 102 by press fitting. The second sleeve 1230 is also installed in the second bore 102 together with the second damping member 1210 inserted therein, so that the second damper 1200 may be easily assembled.

The second sleeve 1230 may be provided with a fixing groove 1231 formed to be recessed on an outer circumferential surface thereof so that the second sleeve 1230 is stably fixed to the block 100 while being prevented from being separated from the block 100 in which the second bore 102 is formed. Also, the second bore 102 may be provided with a fixing protrusion 105 formed to protrude from an inner circumferential surface thereof in a shape corresponding to the fixing groove 1231 and to be inserted into the fixing groove 1231.

As the second sleeve 1230 is configured to contact and surround an outer surface of the second damping member 1210, the second auxiliary damping chambers 1240 are formed between the inner circumferential surface of the second sleeve 1230 and the second concave-convex portions 1212 of the second damping member 1210. That is, the concave portions of the second concave-convex portions 1212 are formed as the second auxiliary damping chambers 1240, so that the pressure pulsation due to the hydraulic pressure of a high pressure introduced from the inlet port IP is first attenuated through the second damping chamber 1211 and is secondarily attenuated through the second auxiliary damping chambers 1240, thereby effectively damping pressure pulsation in the second pressure range ②. At the same time, as the second sleeve 1230 is provided to surround the second damping member 1210, the durability of the second damping member 1210 may be improved.

The second auxiliary damping chambers 1240 may be different from the first auxiliary damping chambers 1140 in at least one of the number and shape. As described above, the second concave-convex portions 1212 may be different from the first concave-convex portions 1112 in at least one of the number and shape, and thus the second auxiliary damping chambers 1240 formed between the second concave-convex portions 1212 and the second sleeve 1230 may also be different from the first auxiliary damping chambers 1140 formed between the first concave-convex portions 1112 and the first sleeve 1130 in the number and shape.

Reference numeral 110 in FIG. 7 denotes a closing member that closes the opening of the second bore 102.

Hereinafter, the operation in which the pressure pulsation of the brake oil is attenuated by the second damper 1200 according to an embodiment of the present disclosure will be described.

The brake oil discharged at a high pressure by the operation of the pump 44 is supplied to the second damper 1200 through the inlet port IP. As the brake oil introduced through the inlet port IP flows into the inside of the second damping member 1210 through the second flow passage 1221 formed in the second stopper member 1220, that is, into the inside of the second damping chamber 1211 so that the second damping member 1210 is elastically deformed, the brake oil is discharged to the outlet port OP after the pressure pulsation is attenuated. In this case, not only the pressure pulsation of the brake oil is attenuated by the elastic deformation of the second damping member 1210 itself because the second damping member 1210 is made of an elastically deformable material, but also the pressure pulsation may be more effectively attenuated because the deformable range of the second damping member 1210 is expanded by the second auxiliary damping chambers 1240 formed between the second sleeve 1230 and the second damping member 1210.

Hereinafter, the operation of sealing the second damping chamber 1211 by the second sealing portion 1216 will be described.

Figure 8:
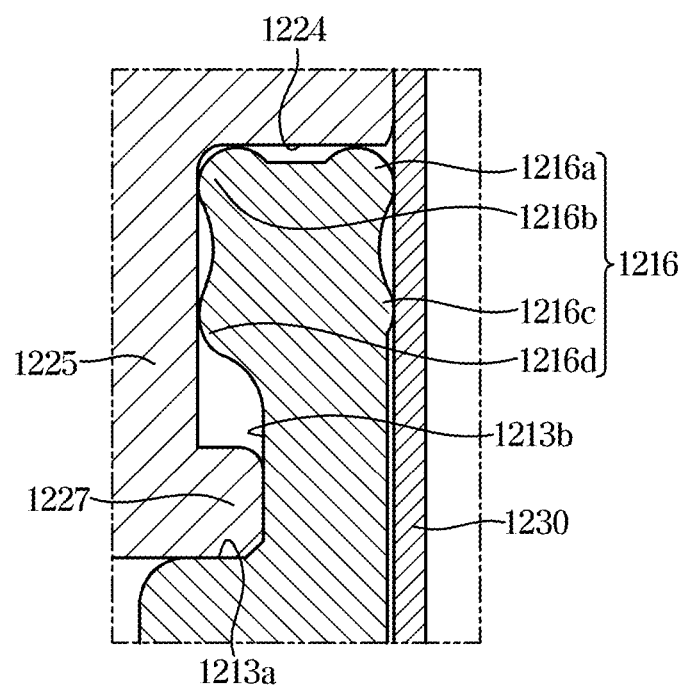
FIG. 8 is an enlarged view of a portion B in FIG. 7, illustrating a state before hydraulic pressure enters a first second chamber.

FIGS. 8 and 9 are an enlarged view of a portion B in FIG. 7 and illustrate a state before hydraulic pressure enters the second damping chamber 1211 and a state in which hydraulic pressure has entered the second damping chamber 1211, respectively.

The second sealing portion 1216 includes the plurality of second protrusions 1216a, 1216b, 1216c, and 1216d that are disposed between the second flange portion 1227 and the second step portion 1224 and urged in a direction to seal the second damping chamber 1211 when the hydraulic pressure of a high pressure is applied to the second damping chamber 1211 by the brake oil.

The second protrusions 1216a, 1216b, 1216c and 1216d are elastically deformed by being urged toward the second sleeve 1230 or the second stopper member 1220 by an internal pressure of the second damping chamber 1211, so that deterioration in the sealing performance over time may be prevented. The second protrusions 1216a, 1216b, 1216c and 1216d may include the second inner protrusions 1216b and 1216d provided to face one surface of the second insertion portion 1225 and the second outer protrusions 1216a and 1216c provided to face one surface of the second sleeve 1230.

The second protrusions 1216a, 1216b, 1216c, and 1216d may be provided in an X shape that is symmetrical in the left-right direction. For example, the second inner protrusions 1216b and 1216d may be composed of the second upper inner protrusion 1216b provided to contact a lower surface of the second step portion 1224 and an outer surface of the second insertion portion 1225 and the second lower inner protrusion 1216d provided to be spaced below the second upper inner protrusion 1216b and contact the outer surface of the second insert portion 1225, and the second outer protrusions 1216a and 1216c may be composed of the second upper outer protrusion 1216a provided to contact the lower surface of the second step portion 1224 and an inner surface of the second sleeve 1230 and the second lower outer protrusion 1216c provided to be spaced below the second upper outer protrusion 1216a and contact the inner surface of the second sleeve 1230. The X-shaped second sealing portion 1216 is assembled between the second stopper member 1220 and the second sleeve 1230 and the side surfaces thereof may be pressed, thereby performing a sealing function.

When the second sealing portion 1216 is provided in an X shape that is symmetrical in the left-right direction, the sealing by the second protrusions 1216a, 1216b, 1216c and 1216d may be performed as follows. First, the brake oil infiltrates between the second flange portion 1227 and the second flange fastening portions 1213a and 1213b when the hydraulic pressure of a high pressure is applied to the brake oil. The infiltrated brake oil presses the second lower inner protrusion 1216d toward the second insertion portion 1225 and the second lower inner protrusion 1216d is elastically deformed by the pressing force, so that the sealing performance may be enhanced.

When the brake oil infiltrates between the second lower inner protrusion 1216d and the second insertion portion 1225 by the action of a high pressure which is higher than a pressure required for the sealing performance of the second lower inner protrusion 1216d, the infiltrated brake oil again presses the second upper inner protrusion 1216b toward the second insertion portion 1225 and the second step portion 1224 and the second upper inner protrusion 1216b is elastically deformed by the pressing force, so that the sealing performance may be enhanced.

When the brake oil infiltrates between the second upper inner protrusion 1216b, the second insertion portion 1225 and the second step portion 1224 by the action of a high pressure which is higher than a pressure required for the sealing performance of the second upper inner protrusion 1216b, the infiltrated brake oil again presses the second upper outer protrusion 1216a toward the second step portion 1224 and the second sleeve 1230 and the second upper outer protrusion 1216a is elastically deformed by the pressing force, so that the sealing performance may be enhanced.

When the brake oil infiltrates between the second upper outer protrusion 1216a, the second step portion 1224 and the second sleeve 1230 by the action of a high pressure which is higher than a pressure required for the sealing performance of the second upper outer protrusion 1216a, the infiltrated brake oil again presses the second lower outer protrusion 1216c toward the second sleeve 1230 and the second lower outer protrusion 1216*c* may be elastically deformed by the pressing force, so that the sealing performance may be enhanced.

As such, the second damping member 1220 having the X-shaped second sealing portion 1216 may prevent deterioration in sealing performance over time. This is possible by providing the inner radius of the cross section of the second inner protrusions 1216*b* and 1216*d* to be smaller than the inner radius of the second-2 flange fastening portion 1213*b* so that when the hydraulic pressure acts, a force is applied to the second inner protrusions 1216*b* and 1216*d* toward the second step portion 1224 and a force is applied to the second outer protrusions 1216*a* and 1216*c* in a direction to widen toward the second sleeve 1230. That is, as the second flange portion 1227 is arranged to be inserted between the second inner protrusions 1216*b* and 1216*d* and the second-1 flange fastening portion 1213*a*, the sealing performance may be enhanced and maintained by applying the hydraulic pressure in the direction in which the brake oil flowing along the outer surface of the second flange portion 1227 seals the second damping chamber 1211.

In order to attenuate the pressure pulsation of the brake oil in various pressure ranges, the first damper 1100 and the second damper 1200 according to an embodiment of the present disclosure may be provided such that the volume change rate of each of the first and second damping chambers 1111 and 1211 with respect to the hydraulic pressure of the brake oil and the hydraulic pressure value of the corresponding brake oil when each of the first and second damping chambers 1111 and 1211 reaches the maximum variable volume are different from each other.

The first damper 1100 and the second damper 1200 may be arranged in series or in parallel at a rear end portion of the pump 44, but the present disclosure is not limited to any one structure. That is, the first damper 1100 and the second damper 1200 may be arranged in various structures and methods provided that they are provided at a rear end portion of the pump 44 to reduce the pressure pulsation due to the hydraulic pressure of the brake oil.

FIG. 10 is a graph illustrating a change in volume per hydraulic pressure of brake oil in the first damping chamber 1111 and the second damping chamber 1211 according to an embodiment of the present disclosure.

Referring to FIGS. 2, 3, and 10, the first damping member 1110 of the first damper 1100 may attenuate the pressure pulsation due to the hydraulic pressure of the brake oil in the first pressure range ① by being elastically deformed by the hydraulic pressure of the brake oil (refer to graph 'A').

Specifically, as the hydraulic pressure of the brake oil gradually increases, the volume of the first damping chamber 1111 also gradually increases, so that the attenuation of the pressure pulsation may be performed. At this time, the first pressure range ① is formed between a pressure at which the volume of the first damping chamber 1111 starts to increase by the hydraulic pressure of the brake oil and a pressure at which the volume of the first damping chamber 1111 may not be further increased by reaching the maximum variable volume. A volume change rate of the first damping chamber 1111 with respect to the hydraulic pressure of the brake oil in the first pressure range ① is a value corresponding to the slope of a graph 'A', and the slope of the graph increases as the volume change rate increases, which means that a change in the volume of the damping chamber is larger than a change in the hydraulic pressure of the brake oil. That is, because the slope of the graph 'A', which is the volume change rate of the first damping chamber 1111 within the first pressure range ①, is formed to be larger than the slope of a graph 'B', which is the volume change rate of the second damping chamber 1211 within the second pressure range ②, which will be described later, the volume change of the first damping chamber 1111 is larger than that of the second damping chamber 1211 in the first pressure range ①, so that the first damping chamber 1111 may more actively respond to pressure pulsation of a relatively low pressure to perform a rapid damping action. However, because the maximum variable volume of the first damping chamber 1111 is exceeded in a pressure range higher than the first pressure range ①, the first damper 1100 may not attenuate the pressure pulsation, resulting in noise and vibration. In particular, considering that the higher the hydraulic pressure, the larger the pressure pulsation occurs, it is difficult to expect the first damping chamber 1111 to exert an effective action on the pressure pulsation occurring in a relatively high pressure range as in the second pressure range ②.

Referring FIGS. 6 to 10, the second damping member 1210 of the second damper 1200 may attenuate the pressure pulsation due to the hydraulic pressure of the brake oil in the second pressure range ② by being elastically deformed by the hydraulic pressure of the brake oil (refer to graph 'B').

Specifically, as the hydraulic pressure of the brake oil gradually increases, the volume of the second damping chamber 1211 also gradually increases, so that the attenuation of the pressure pulsation may be performed. At this time, the second pressure range ② is formed between a pressure at which the volume of the second damping chamber 1211 starts to increase by the hydraulic pressure of the brake oil and a pressure at which the volume of the second damping chamber 1211 may not be further increased by reaching the maximum variable volume. A volume change rate of the second damping chamber 1211 with respect to the hydraulic pressure of the brake oil in the second pressure range ② is a value corresponding to the slope of a graph 'B', and the slope of the graph decreases as the volume change rate decreases, which means that a change in the volume of the damping chamber is smaller than a change in the hydraulic pressure of the brake oil. That is, because the slope of the graph 'B', which is the volume change rate of the second damping chamber 1211 within the second pressure range ②, is formed to be smaller than the slope of a graph 'A', which is the volume change rate of the first damping chamber 1111 within the first pressure range ①, the volume change of the second damping chamber 1211 is not larger than that of the first damping chamber 1111, so that the second damping chamber 1211 does not actively intervene in the pressure pulsation of a low pressure. However, because the volume of the second damping chamber 1211 may be changed even in the second pressure range ② which is a relatively higher pressure region than the first pressure range ①, the second damping chamber 1211 may perform the damping action of the pressure pulsation occurring in a high pressure range.

As such, the pulsation damping device 1000 according to an embodiment of the present disclosure may perform a rapid damping action with respect to the pressure pulsation of a low pressure and may stably and effectively perform a damping action even with respect to the pressure pulsation of a high pressure by applying two of the dampers 1100 and 1200 in which the volume change rates of the respective damping chambers 1111 and 1211 with respect to the hydraulic pressure of the brake oil are different from each other and the levels of the hydraulic pressures of the corresponding brake oils in the respective damping chambers 1111 and 1211 when reaching the maximum variable volumes are different from each other (refer to graph 'C').

In order to form the volume change rate of the first damping chamber 1111 with respect to the hydraulic pressure of the brake oil to be larger than the volume change rate of the second damping chamber 1211, The first damping member 1110 and the second damping member 1210 may be provided with materials having different elastic restoring forces, respectively. Specifically, by providing the elastic modulus of the first damping member 1110 to be smaller than the elastic modulus of the second damping member 1210, the volume change amount of the first damping chamber 1111 with respect to the change in the hydraulic pressure of the brake oil may be larger than that of the second damping chamber 1211, and at the same time the hydraulic pressure (the maximum pressure value within the first pressure range) of the corresponding brake oil in the first damping chamber 1111 when reaching the maximum variable volume may be smaller than that (the maximum pressure value within the second pressure range) of the corresponding brake oil in the second damping chamber 1211 when reaching the maximum variable volume.

In addition, by providing the first and second damping members 1110 and 1210 to be different in size and shape, the volume change rates of the respective damping chambers and the levels of the hydraulic pressures of the corresponding brake oils in the respective damping chambers when reaching the maximum variable volumes may be different. For example, by providing the thickness between the outer circumferential surface of the first damping member 1110 and the inner circumferential surface of the first damping chamber 1111 to be smaller than the thickness between the outer circumferential surface of the second damping member 1210 and the inner circumferential surface of the second damping chamber 1211, the volume change amount of the first damping chamber 1111 with respect to the change in the hydraulic pressure of the brake oil may be larger than that of the second damping chamber 1211, and at the same time the hydraulic pressure (the maximum pressure value within the first pressure range) of the corresponding brake oil in the first damping chamber 1111 when reaching the maximum variable volume may be smaller than that (the maximum pressure value within the second pressure range) of the corresponding brake oil in the second damping chamber 1211 when reaching the maximum variable volume.

Alternatively, by providing the ratio of the volume of the first damping chamber 1111 to the volume of the first damping member 1110 to be greater than the ratio of the volume of the second damping chamber 1211 to the volume of the second damping member 1210, the volume change amount of the first damping chamber 1111 with respect to the change in the hydraulic pressure of the brake oil may be larger than that of the second damping chamber 1211, and at the same time the hydraulic pressure (the maximum pressure value within the first pressure range) of the corresponding brake oil in the first damping chamber 1111 when reaching the maximum variable volume may be smaller than that (the maximum pressure value within the second pressure range) of the corresponding brake oil in the second damping chamber 1211 when reaching the maximum variable volume.

Besides, by providing the variable volume amount of the first auxiliary damping chamber 1140 to be larger than that of the second auxiliary damping chamber 1240, the volume change rate of the first damping chamber 1111 with respect to the hydraulic pressure of the brake oil may be larger than that of the second damping chamber 1211, and the variable pressure range of the first damping chamber 1111 may be smaller than that of the second damping chamber 1211.

The first damper 1100 and the second damper 1200 may be arranged sequentially in series or in parallel at a rear end portion of the pump 44.

As is apparent from the above, a pulsation damping device of a hydraulic brake system according to an embodiment of the present disclosure has an effect of effectively damping pressure pulsation in various pressure ranges of brake oil.

Further, a pulsation damping device of a hydraulic brake system according to an embodiment of the present disclosure has an effect of effectively reducing and suppressing noise and vibration from occurring.

Further, a pulsation damping device of a hydraulic brake system according to an embodiment of the present disclosure has an effect of improving the operation feeling of a driver.

Further, a pulsation damping device of a hydraulic brake system according to an embodiment of the present disclosure has an effect of improving structural stability and operational reliability.

Further, a pulsation damping device of a hydraulic brake system according to an embodiment of the present disclosure has an effect of having a simple structure and being easy to mount and install.

What is claimed is:

1. A pulsation damping device of a hydraulic brake system which attenuates a pressure pulsation of brake oil discharged from a pump, comprising:
    a first damper having a first damping chamber whose volume is varied by the hydraulic pressure of the brake oil; and
    a second damper having a second damping chamber whose volume is varied by the hydraulic pressure of the brake oil,
    wherein a volume change rate of the first damping chamber relative to the hydraulic pressure of the brake oil is provided to be larger than a volume change rate of the second damping chamber, and
    the hydraulic pressure of the corresponding brake oil in the first damping chamber when reaching a maximum variable volume of the first damping chamber is provided to be smaller than the hydraulic pressure of the corresponding brake oil in the second damping chamber when reaching a maximum variable volume of the second damping chamber.

2. The pulsation damping device according to claim 1, wherein:
    the first damper further includes a first damping member having the first damping chamber formed therein, a first stopper member coupled to the first damping member and having a first flow passage communicating a hydraulic passage through which the brake oil flows to the first damping chamber, and a first sleeve surrounding the first damping member and coupled to the first stopper member; and
    the second damper further includes a second damping member having the second damping chamber formed therein, a second stopper member coupled to the second damping member and having a second flow passage communicating a hydraulic passage through which the brake oil flows to the second damping chamber, and a second sleeve surrounding the second damping member and coupled to the second stopper member.

3. The pulsation damping device according to claim 2, wherein:
- at least one first concave-convex portion is provided on an outer circumferential surface of the first damping member;
- at least one second concave-convex portion is provided on an outer circumferential surface of the second damping member;
- a first auxiliary damping chamber is formed between the first concave-convex portion and the first sleeve; and
- a second auxiliary damping chamber is formed between the second concave-convex portion and the second sleeve.

4. The pulsation damping device according to claim 3, wherein:
- the first damping member includes a first coupling portion formed in a hollow shape on an inlet/outlet side of the first damping chamber and coupled to the first stopper member;
- the first stopper member includes a first insertion portion coupled to an inner circumferential surface of the first coupling portion, and a first cap portion closing a first bore on which the first sleeve is mounted and coupled to an inner circumferential surface of the first sleeve;
- the second damping member includes a second coupling portion formed in a hollow shape on an inlet/outlet side of the second damping chamber and coupled to the second stopper member; and
- the second stopper member includes a second insertion portion coupled to an inner circumferential surface of the second coupling portion and a second cap portion coupled to an inner circumferential surface of the second sleeve.

5. The pulsation damping device according to claim 4, wherein:
- the first stopper member further includes a first coupling groove formed to be recessed on an outer circumferential surface of the first insertion portion;
- the first damping member further includes a first sealing portion provided on the first coupling portion and entering and seated in the first coupling groove;
- the second stopper member further includes a second coupling groove formed to be recessed on an outer circumferential surface of the second insertion portion; and
- the second damping member further includes a second sealing portion provided on the second coupling portion and entering and seated in the second coupling groove.

6. The pulsation damping device according to claim 1, wherein:
- a variable volume amount of the first damping chamber is provided to be larger than a variable volume amount of the second damping chamber.

7. The pulsation damping device according to claim 1, wherein:
- the first damper includes a first damping member having the first damping chamber formed therein;
- the second damper includes a second damping member having the second damping chamber formed therein; and
- the thickness between an outer circumferential surface of the first damping member and an inner circumferential surface of the first damping chamber is provided to be smaller than the thickness between an outer circumferential surface of the second damping member and an inner circumferential surface of the second damping chamber.

8. The pulsation damping device according to claim 1, wherein:
- the first damper includes a first damping member having the first damping chamber formed therein;
- the second damper includes a second damping member having the second damping chamber formed therein; and
- the ratio of the volume of the first damping chamber to the volume of the first damping member is provided to be greater than the ratio of the volume of the second damping chamber to the volume of the second damping member.

9. The pulsation damping device according to claim 1, wherein:
- the first damper includes a first damping member having the first damping chamber formed therein;
- the second damper includes a second damping member having the second damping chamber formed therein; and
- the elastic modulus of the first damping member is provided to be smaller than the elastic modulus of the second damping member.

10. The pulsation damping device according to claim 1, wherein:
- the first damper and the second damper are arranged in series at a rear end portion of the pump.

11. The pulsation damping device according to claim 1, wherein:
- the first damper and the second damper are arranged in parallel at a rear end portion of the pump.

12. A pulsation damping device of a hydraulic brake system which attenuates a pressure pulsation of brake oil discharged from a pump, comprising:
- a first damper having a first damping chamber whose volume is varied by the hydraulic pressure of the brake oil; and
- a second damper having a second damping chamber whose volume is varied by the hydraulic pressure of the brake oil,
- wherein a volume change rate of the first damping chamber relative to the hydraulic pressure of the brake oil is provided to be larger than a volume change rate of the second damping chamber, and
- the hydraulic pressure of the corresponding brake oil in the first damping chamber when reaching a maximum variable volume of the first damping chamber is provided to be smaller than the hydraulic pressure of the corresponding brake oil in the second damping chamber when reaching a maximum variable volume of the second damping chamber,
- wherein:
- at least one of the first damper and the second damper further includes a sealing portion for preventing leakage of the brake oil entering the damping chamber; and
- the sealing portion includes protrusions that are urged in a direction to seal the damping chamber as the hydraulic pressure of the brake oil entering the damping chamber increases.

13. The pulsation damping device according to claim 12, wherein:
- the first damper further includes a first damping member having the first damping chamber formed therein, a first stopper member coupled to the first damping member and having a first flow passage communicating a hydraulic passage through which the brake oil flows to the first damping chamber, and a first sleeve surrounding the first damping member and coupled to the first stopper member; and the second damper further includes a second damping member having the second damping chamber formed therein, a second stopper member coupled to the second damping member and having a second flow passage communicating a hydraulic passage through which the brake oil flows to the second damping chamber, and a second sleeve surrounding the second damping member and coupled to the second stopper member, and wherein:

at least one of the first stopper member and the second stopper member includes an insertion portion protruding toward the damping chamber and guiding the brake oil transferred along the flow passage to the damping chamber, a flange portion provided at a lower portion of the insertion portion and having a larger diameter than the insertion portion, and a step portion provided at an upper portion of the insertion portion and facing and upper surface of the sealing portion; and the sealing portion is disposed between the flange portion and the step portion.

14. The pulsation damping device according to claim 13, wherein:

at least one of the first damping member and the second damping member further includes flange fastening portions provided at a lower portion of the sealing portion and in which the flange portion is fitted.

15. The pulsation damping device according to claim 14, wherein:

the flange fastening portions include a first flange fastening portion provided to be in contact with a bottom surface of the flange portion and a second flange fastening portion provided to be in contact with a side surface of the flange portion.

16. The pulsation damping device according to claim 15, wherein:

the protrusions include an inner protrusions provided to face one surface of the insertion portion and an outer protrusions provided to face one surface of the first sleeve; and an inner radius of the inner protrusions is provided to be smaller than an inner radius of the flange fastening portions.

17. The pulsation damping device according to claim 16, wherein:

the inner protrusions include an upper inner protrusion provided to be in contact with a lower surface of the step portion and an outer surface of the insertion portion and a lower inner protrusion provided to be spaced apart from a lower portion of the upper inner protrusion and in contact with the outer surface of the insertion portion; and the outer protrusions include an upper outer protrusion provided to be in contact with the lower surface of the step portion and an inner surface of the sleeve and a lower outer protrusion provided to be spaced apart from a lower portion of the lower inner protrusion and in contact with an outer surface of the sleeve.

18. The pulsation damping device according to claim 17, wherein:

the protrusions are provided in an X-shape symmetrical in the left-right direction.

19. The pulsation damping device according to claim 13, wherein:

the protrusions are elastically deformed by being pressed toward the sleeve or the stopper member by the hydraulic pressure of the brake oil that has entered the damping chamber.

20. The pulsation damping device according to claim 13, wherein:

at least one of the first sleeve and the second sleeve includes an accommodating portion into which the damping member is inserted, and a fastening portion coupled to the stopper member in a forced fit manner.

* * * * *